(12) United States Patent
Fraser et al.

(10) Patent No.: US 6,629,149 B1
(45) Date of Patent: Sep. 30, 2003

(54) NETWORK SYSTEM AND METHOD (75) Inventors: Alexander Gibson Fraser, Bernardsville, NJ (US); Glenford Mapp, Cambridge (GB)

(73) Assignee: AT&T Corp., New York, NY (US)

( * ) Notice: Subject to any disclaimer, the term of this patent is extended or adjusted under 35 U.S.C. 154(b) by 193 days.

(21) Appl. No.: 09/375,429

(22) Filed: Aug. 17, 1999

(51) Int. Cl.⁷ .................. G06F 15/16; G06F 15/177
(52) U.S. Cl. .................. 709/245; 709/220; 709/250
(58) Field of Search .................. 709/245, 250, 709/220, 221, 242, 238

(56) References Cited

U.S. PATENT DOCUMENTS

| | | | | |
|---|---|---|---|---|
| 4,307,446 A | * | 12/1981 | Barton et al. | 364/200 |
| 5,681,008 A | * | 10/1997 | Kinstler | 244/3.11 |
| 5,727,057 A | * | 3/1998 | Emery et al. | 379/211 |
| 5,856,974 A | * | 1/1999 | Gervais et al. | 370/392 |
| 6,058,171 A | * | 5/2000 | Hoopes | 379/142 |
| 6,233,242 B1 | * | 5/2001 | Mayer et al. | 370/412 |

* cited by examiner

Primary Examiner—Zarni Maung (57) ABSTRACT

A system and method for networking. A globally valid address in a Wide Area Network includes device identification information and device location information, wherein the device identification information is distinct from the device location information. This facilitates providing network services for mobile devices. Device identification information includes a persistent, globally unique identity for devices that can be coupled to the network, and for each communication endpoint adapted to be coupled to the Wide Area Network. Network addresses are portable, allowing a network services customer to easily change its network service provider, and supporting hosts that have more than one network interface. Inline agents provide network services efficiently and transparently to users. The present invention provides a definition of network service that scales well and is capable of exploiting opportunities that will be presented by new network technologies.

18 Claims, 4 Drawing Sheets

NETWORK SYSTEM AND METHOD

FIELD OF THE INVENTION

The field of this invention is networking, and in particular, systems and methods for large scale networking.

BACKGROUND OF THE INVENTION

The architectures presently employed for certain large networks, such as the Internet, often do not scale well. That is, as the size of the network grows, its structure fails to adequately accommodate the growth in demand for services provided on the network, the routing of messages to new nodes, etc. As used herein, the term "network" is a set of computers that are coupled such that they can communicate with each other. Examples of networks include a local area network (LAN) and a wide area network (WAN). As used herein, a WAN can include one or more subnetworks (e.g., LANs) that are coupled together. A subnetwork interfaces to the rest of the WAN through one or more "gateways." An example of a gateway is a host (a computer with a network address) that is coupled both to a LAN and a WAN, and which handles traffic between devices that comprise the LAN and other devices coupled to the WAN that are not part of the LAN. An example of a LAN is a network that serves a set of users in a single building, and that operates in accordance with the Ethernet protocol that is well-known in the art. An example of a WAN is the Internet. The Internet is a large scale network of subnetworks that communicate using the Internet Protocol version 4 ("IPv4") described in Douglas E. Comer, Internetworking with TCP/IP, vol.1 , Prentice Hall 1991. As used herein, the term "coupled" means directly or indirectly connected. Thus, if A is directly connected to B, then A is said to be coupled to B. Likewise, if A is directly connected to B, and B is directly connected to C, then A is said to be coupled to C.

The scalablility of a network is often at least partly influenced by its addressing scheme, i.e., the way a node (a device that is coupled to the network) is located on the network. An example of an addressing scheme is IPv4 , which is used on the Internet. IPv4 specifies an address of 32 bits arranged in four octets, i.e., four numbers, each having a value between 0 and 255. An example of an IPv4 address is 132.56.9.234. The number of nodes and other entities on the Internet that use, or could use, a unique address are proliferating at such a rate so as to exhaust the number of addresses available. Furthermore, experience with Internet address administration indicates that practical concerns demand an address space that is substantially larger than the number of devices that require addresses. As used herein, a "device" is any hardware entity capable of receiving and/or sending information over a network. Examples of a device include a host, a client, a handheld appliance that includes a microprocessor, etc.

In response to the problems related to the inadequacies of the IPv4 addressing scheme, the Internet Engineering Task Force ("IETF", the body that sets the standards for the Internet) has proposed a new standard, Internet Protocol version 6 ("IPv6"), which his described in Stephen A. Thomas, IPing and the TCP/IP Protocols, John Wiley 1996. IPv6 uses an address space comprising sixteen octets, rather than the four used by IPv4. This provides a substantially greater number of addresses for use on the network. However, IPv6 has not been widely adopted for the Internet, largely because its adoption would require a large scale replacement of hardware and software that is presently in place on the Internet. Instead, stopgap solutions have been adopted that can be handled by the existing technology base, but which are temporary and will not be very satisfactory as the Internet develops further.

For example, to overcome the shortage of address space, Internet Service Providers ("ISP") "lend" an IPv4 addresses to each subscriber that logs in. The subscriber does not have a permanently assigned address, but is rather assigned a temporary address. The temporary address assignment remains effective during the subscriber's session on the network. Another known solution Network Address Translation ("NAT"), which permits the ISP to offer IPv4 addresses to its subscribers even though those addresses are not unique on the Internet, and may be used by subscribers of other ISPs. As packets pass between a subscriber and the WAN (e.g., the Internet) through the ISP, the ISP translates from the address used by the subscriber to a temporarily available address that is unique to the WAN, and vice versa. In the future, an increasing number of users can be expected to be online all the time and will want to publish their addresses so that other can reach them directly. NAT disadvantageously does not allow a user to publish a permanently assigned, globally unique address by which the user can be reached directly from another node on the WAN.

The Federal Communications Commission ("FCC") has ruled that telephone service subscribers must be permitted to switch from one service provider to another without being forced to change to a new telephone number. That capability, which has been retrofitted at some expense in the telephone network, is disadvantageously not present today in the Internet. A customer that switches from one ISP to another usually is forced to incur the expense and inconvenience of changing her IP address. This is disadvantageous because the IPv4 address embodies information about the internal structure of the network, including the relationship of the ISP to the WAN. This means that in some cases, when an organizational change occurs entirely within the Internet, such as an ISP obtaining a different access provider to the WAN, users are required to change to a new IP address. This can entail considerable expense and inconvenience for users, especially corporate customers who have hundreds or thousands of machines with network addresses. Some large customers have refused to make the change. In this case, it is the service provider that pays a penalty because the ISP address space becomes more fragmented and requires more resources to properly route packets between its users and the WAN.

The present IP and proposed addressing schemes combine device identity information with information about the network structure in the neighborhood of the device, disadvantageously precluding global addressing for mobile devices. Thus, it is not possible to change the location of a device without also changing its address. Also, an IP address presently identifies a device, but not the true endpoint of communication, which can lie within the software of that device. This disadvantageously makes it difficult at best for network service assets to determine the type of traffic that is being carried in order to provide the appropriate quality of service. For example, it may be acceptable for file transfer packets to be delivered with slight delays and with little loss in quality of service. On the other hand, voice or interactive video packets cannot be delivered with substantial delays without significantly degrading the quality of service experienced by the communicating users. Network service providers need to know what type of traffic a given packet or set of packets carries in order to properly route the packet in the appropriate fashion (e.g., with the correct level of priority).

Known systems identify types of traffic by having routers and switches snoop into TCP and higher level protocols, which is disadvantageous because the presence of this software in the network prevents subscribers from changing to another protocol when new technology makes such a change advantageous. This disadvantageously reduces the robustness of the network service, and restricts the freedom of the service provider to invent services that are customized and/or customizable for individual data flows and individual applications.

A known method of providing network services is "tunneling." A packet that is sent to an ultimate destination X is encapsulated with address information that delivers the packet to device Y. Device Y strips the encapsulated address information from the packet, and forwards the packet to X. Tunneling is used, for example, when a packet needs to be sent to a device X through a network that doesn't recognize the address or protocol being used to communicate X. Thus, it is sent to Y, which by prearrangement, knows how to properly dispose of the packet (send it to X). For example, a sender S and a gateway Y are coupled to each other through a WAN. X is coupled to gateway Y through a LAN. In other words, Y is the gateway between the WAN and the LAN, and knows how to route packets addressed to any device on the LAN. X is not visible to the WAN, i.e., the WAN would not know how to route a packet addressed to X. However, X is visible to gateway Y. Thus, sender S encapsulates the packet to X with address information to gateway Y, and sends it into the WAN. The WAN routes the packet to gateway Y, which strips the encapsulated address information, and sees that the packet is to be forwarded to X, and does so. Tunneling is disadvantageous because it requires every sender that wishes to tunnel to know the full address of the ultimate destination of a packet, as well as forwarding arrangements for the packet through the WAN. In the above example, sender S has to know that it cannot use X's address explicitly, but rather has to tunnel to reach X. Sender S must also know that Y is a suitable intermediary for communications with X. X is not visible to the WAN; that Y can forward the packet to X; and Y's address. Keeping every tunneling sender informed with this type of up-to-date information can be a complex task that does not scale well. A tunneled packet must be encapsulated with at least two sets of address information (X's and Y's.) With multiple tunneling steps, each packet can acquire a large overhead of several successive encapsulations. This overhead can be inefficient. A better system would provide packet forwarding and other network services to a sender without requiring the sender to know the full address of the ultimate destination of each of its packets, and without incurring the overhead of successive encapsulation.

More effective, long term solutions should address problems such as ensuring a sufficient address space to meet future needs; providing a persistent, globally unique identity for devices that can be coupled to the network; providing a separate address for each communication endpoint adapted to be coupled to the network; providing network address portability for customers who change their service provider; supporting mobile hosts; supporting hosts that have more than one network interface; and provide a definition of network service capable of accommodating technological changes that will provide new opportunities for network users. For example, the telephone system comprises a circuit-switched network that carries any information that can be encoded in a 3.5 kHz bandwidth. This service definition, which was created at the start of the $20^{th}$ century, was flexible and capable enough to accommodate the many changes in telephony technology that have occurred throughout this century. A similar service definition should be made for a network such as the Internet. The service definition for the Internet should be at the network layer (i.e., the IP protocol). In this light, transport protocols such as Transmission Control Protocol (TCP) and User Datagram Protocol (UDP) should be regarded as applications that act as users of the network service. This approach is exemplified by the IPSEC security protocol, in which the payload of a packet is encapsulated and encrypted within a secure protocol. Under IPSEC, the payload is defined to include the transport protocols and their respective payloads. It is appropriate that IPSEC come under the purview of users of the network, and therefore that it be viewed as an application of the network service.

SUMMARY OF THE INVENTION

In accordance with an embodiment of the present invention, every global-valid address (such as an IP address) contains device identity in a first field and device location information in a second field. The addressing scheme in accordance with an embodiment of the present invention advantageously supports dynamic correction of location information. For example, a mobile telephone has a unique device identity, as well as location information in its address field. When the mobile telephone moves, the geographical location information in the address field becomes outdated, but the device identity remains unchanged. An embodiment of the present invention advantageously updates the geographical location information in the address field so as to maintain its accuracy. The device identity field is of a sufficient size to address a plurality of networked devices per person.

In one embodiment of the present invention, the network is an interconnected set of subnetworks, such as the Internet. For example, the network includes LANs that are interconnected to comprise a WAN. One type of device on a first LAN is recognizable by the WAN, i.e., the WAN can explicitly route a message to the device. In accordance with an embodiment of the present invention, at least every device that is recognized by the WAN has a globally unique identity. A device that is recognizable by the WAN is called a "global device." Examples of a global device include fixed and wireless telephones that can communicate with other telephones coupled to the WAN. A device that is not recognizable by the WAN is called a "local device." Examples of local devices include a printer that is dedicated to a LAN and not addressable outside the LAN, a shared disk drive on a LAN that is not addressable from the WAN. Note than in certain embodiments, a printer and/or a shared disk drive on a LAN can be global devices, provided they are addressable from the WAN. In accordance with an embodiment of the present invention, a range of device identities is allocated for local devices that are connected to a LAN, but which are not directly visible from the whole WAN.

In one embodiment, where there are multiple sources of communication within a device, each communication endpoint is separately identified. For example, each application that communicates through the WAN (e.g., an IP telephony application, network-based scheduling application, etc.) has its own identifier.

In accordance with one embodiment of the present invention, at least one segment of the address location field is allocated to users (e.g., individual users, network administrators, service providers) to accommodate proprietary packet routing methods. For example, a large corporation might wish to structure the location address to reflect the way in which its network is administered. The present invention advantageously provides a network definition that scales well, and will facilitate exploiting opportunities presented by the development and deployment of new networking technologies.

DETAILED DESCRIPTION

An address structure in accordance with an embodiment of the present invention is:

| TYPE FIELD | LOCATION ADDRESS FIELD | DEVICE IDENTITY FIELD | SOCKET FIELD |
|---|---|---|---|

The TYPE FIELD includes type field information ("T") that identifies the address format and function, thereby distinguishing the format used for the packet from other WAN (e.g., Internet) address formats that have been, or may be, invented. T typically has a value between zero and ten bits long. In one embodiment, the TYPE FIELD also includes a LOCATION CORRECTION FIELD that includes location correction information ("L") that assists in the correction of geographical location information stored elsewhere in the address. For example, length of the LOCATION CORRECTION FIELD in one embodiment is a single bit. When this bit is 0, it indicates that the geographical location information included in the address is correct.

When the bit is 1, it indicates that the geographical location information included in the address may be incorrect.

LOCATION ADDRESS FIELD includes information about the location of a demark between the WAN and the local network (e.g., LAN) to which the device to which the packet is being sent is coupled. As used herein, the term "demark" is an interface (e.g., point of connection) between the WAN and a LAN. For example, there is a demark at the point at which the WAN enters a home. The LOCATION ADDRESS FIELD includes information (a "location address") about the location of the demark which lies between the WAN and the local network to which a device is coupled. Examples of location addresses are: 2354; 42; and 9A453D. These are binary number structures that are adapted to be helpful in routing packets through the WAN to demarks. In another embodiment, the location address can convey geographical and/or network information. For example, 71638 indicates an interface located in the area covered by the 716 Public Switched Telephone Network (PSTN) area code, in that portion of the network that serves exchanges beginning with the digits 3 and 8. Another example of a location address is an IP address, such as 24.145.3.56. In one embodiment, the location address field includes a NETWORK CODE SUBFIELD and a DEMARK CODE SUBFIELD:

| LOCATION ADDRESS FIELD | |
|---|---|
| NETWORK CODE SUBFIELD | DEMARK CODE SUBFIELD |

The NETWORK CODE SUBFIELD contains a globally unique identifier for a WAN to which the interface to the device is coupled. The DEMARK CODE SUBFIELD contains information (e.g., a "demark location address") identifying the location of the demark in the WAN. This structure is useful in a network architecture that includes an internetwork of WANs.

A location address identifies the point at which a first network interfaces with a second network, e.g., where a LAN interfaces with a global network such as the Internet. A purpose of the location address in one embodiment is to support the forwarding of a packet from a first network (e.g., the Internet) to and through a second network (e.g., a WAN) to a device coupled. The device coupled to the LAN can be a global device (with a device identifier recognized by the WAN) or a local device (e.g., with a device identifier only recognized by network assets directly connected to the LAN.) In accordance with an embodiment of the present invention, the location address is designated to be the destination for a packet as it travels through the WAN. This advantageously permits efficient packet forwarding and utilization of network assets by distributing addressing responsibilities among the original sender of a packet and a gateway network asset, e.g., a Network Interface Unit (NIU) that acts as a gateway between a WAN and a LAN. For example, in certain embodiments, it is advantageous for the original sender of a packet to address the packet to a NIU at a given demark location; the NIU operates upon information contained in the rest of the address of the packet and/or in the payload of the packet to transform the packet and/or route it to a particular destination. This can be efficient because the ultimate destination may be dynamic, i.e., dynamically selected by the NIU based upon the availability of the device as listed in a device-availability database accessible to the NIU, based upon network conditions (e.g., congestion) in the second network (conditions that may be invisible to the original sender), etc. Using the LOCATION ADDRESS FIELD in accordance with an embodiment of the present invention can therefore intelligently distribute routing and other functions for the packet in an intelligent and efficient way. It permits, for example, routing tables to be compact, the forwarding process to be fast, and the appropriate quality of service to be provided based upon, for example, the type of traffic carried in a packet, the pricing plan to which the sender and/or receiver subscribe, the importance of the integrity and/or confidentiality of the contents of a packet, etc. As used herein, the term "integrity" means protecting the information carried by a packet (address and/or payload) from unauthorized manipulation. "Confidentiality" means protecting the information carried by a packet (address and/or payload) from unauthorized disclosure.

In accordance with an embodiment of the present invention, the NETWORK CODE SUBFIELD includes the location address ("shared location address") that is shared by (i.e., available to) all service providers. The NETWORK CODE SUBFIELD can advantageously be administered by an international standards body, such as the International Telecommunications Union ("ITU") in conjunction with national governments. The DEMARK CODE SUBFIELD contains location address information ("particular location address") that is particular to a service provider's operations in a particular geographical and/or network-topological territory. It advantageously permits the service provider to employ an addressing scheme that best fits its particular needs for providing its particular types of service to its subscribers. This flexibility advantageously allows at least a part of the addressing scheme to be tailored to local conditions by the local service provider. That is, the address in accordance with an embodiment of the present invention is not entirely dictated by a rigid global address architecture. This advantageously permits the local provider to be innovative and creative in determining the way in which the subscriber's addressing scheme is used to provide a high quality of service. Such flexibility encourages innovation and competition because a more intelligently designed addressing system (e.g., that includes the DEMARK CODE SUBFIELD in accordance with an embodiment of the present invention) can provide a first service provider with a competitive advantage over a second service provider with a less well-designed addressing scheme. This is innovative because it brings a potentially large number of additional players (the service providers) into the creative process of designing addressing schemes.

In one embodiment, the particular location address in the DEMARK CODE SUBFIELD is an expression (information) into which is encoded the location of a demark, and in one embodiment, a "hint" as to how to get to the demark. For example, the particular location address can include the address of a particular NIU along with an identifier of the large subnetwork in which the NIU is located. The identifier of the large subnetwork is the "hint" that advantageously speeds routing of the packet to the NIU, whereas the address of the NIU is the exact location of the demark within the WAN to which the demark is coupled. The demark location code 402 can have a hierarchical structure such as that of an IPv4 address so that packet forwarding can use the technology developed for use in IPv4 networks, in accordance with an embodiment of the present invention.

In one embodiment, shared location addresses for use in the NETWORK CODE SUBFIELD are advantageously assigned to countries in proportion to their respective populations. For example, a bit length m for the network code field 401 provides $2^m$ distinct addresses. These addresses can advantageously be divided by country in accordance with each country's proportion of the world's population. For example, if country ABC has X% of the world's population, then the number of addresses assigned to that country could be $2^m$ (X/100). In another embodiment, the network code assignment system takes into account other factors, such as the growth rate of a country's population, the rate of growth in automation in a country (e.g., growth rate of number of network service providers, nodes, personal computers, etc.,) etc. The following table shows the number of network codes for a 16 and 20 bit length of the NETWORK CODE SUBFIELD for the five most populous countries in the world based upon the countries' approximate population.

| Country | Population (1000) | Number of Distinct Network Codes 16 Bits | 20 Bits |
| --- | --- | --- | --- |
| China | 1,255,698 | 12,221 | 191,503 |
| India | 982,223 | 9,560 | 149,796 |
| United States | 274,028 | 2,667 | 41,791 |
| Indonesia | 206,338 | 2,008 | 31,468 |
| Brazil | 165,851 | 1,614 | 25,293 |

The embodiment of the NETWORK CODE SUBFIELD space allocation illustrated in the table above allocates 90% of all available network codes (57,600 for a 16 bit field and 900,000 for a 20 bit field.) Every country is guaranteed at least four network address codes (over 38 countries have a population under 100,000). An average of 100,000 people are served by one network for a 16 bit field, and an average of 7,000 people are served by one network for a 20 bit field, in this embodiment. The present state of automation and network use in the world indicates that a large network should have about one million demarks. It would be reasonable for the entire DEMARK CODE SUBFIELD to have a length of at least 28 bits, and the entire LOCATION ADDRESS FIELD should have a length of at least 48 bits in order to provide a minimum amount of flexibility.

The DEVICE IDENTITY FIELD includes a globally unique reference ("globally unique identifier") to a device coupled to the WAN. In one embodiment of the present invention, the globally unique identifier in the DEVICE IDENTITY FIELD is entirely distinct from location address, which is included in a separate field.

The DEVICE IDENTITY FIELD can have its own substructure. In one embodiment, the DEVICE IDENTITY FIELD includes a YEAR SUBFIELD, a SERIAL NUMBER SUBFIELD, and/or a MANUFACTURER SUBFIELD:

| DEVICE IDENTITY FIELD | | |
| --- | --- | --- |
| YEAR SUBFIELD | SERIAL NUMBER SUBFIELD | MANUFACTURER SUBFIELD |

The MANUFACTURER SUBFIELD includes a "manufacturer code" that identifies the manufacturer of the device. For example, ATT3245 can identify a telecommunications application for Internet telephony deployed by AT&T. The SERIAL NUMBER SUBFIELD includes a "serial number" that distinguishes the particular device from other such devices deployed by the manufacturer. The YEAR SUBFIELD includes information about the date (e.g., year and/or day and/or month) when the manufacturer code was issued to the manufacturer, e.g., by a standards body. Although in this embodiment, it is called the "YEAR SUBFIELD", it can include any suitable date information, and need not include an indication of a particular year. Together, the contents of the YEAR SUBFIELD, the SERIAL NUMBER SUBFIELD, and the MANUFACTURER SUBFIELD serve to uniquely identify the device to the WAN.

The DEVICE IDENTITY FIELD should be sufficiently large to provide unique addresses to a plurality of devices per person. Each of these addresses corresponds to a distinct global device. It is estimated that in the future, the average person will own or be otherwise associated with a plurality of such global devices. In order to accommodate at least 20 distinct global devices per person, the DEVICE IDENTITY FIELD should have a length of at least 44 bits.

In one embodiment of the present invention, Ethernet addresses form the basis for establishing device identity information, e.g., globally unique identifiers. Ethernet addresses are 48 bits long, and are presently mostly globally unique. Ethernet addresses are administered by IEEE, which issues a 24 bit manufacturer identifier to any manufacturer seeking to include an Ethernet address in its product. IEEE suggests that the manufacturer append a serial number 24 bits in length to complete the 48 bit address. In order to best serve as the foundation of the device identity information in accordance with an embodiment of the present invention, IEEE should mandate that each Ethernet address be globally unique.

Figure 1:
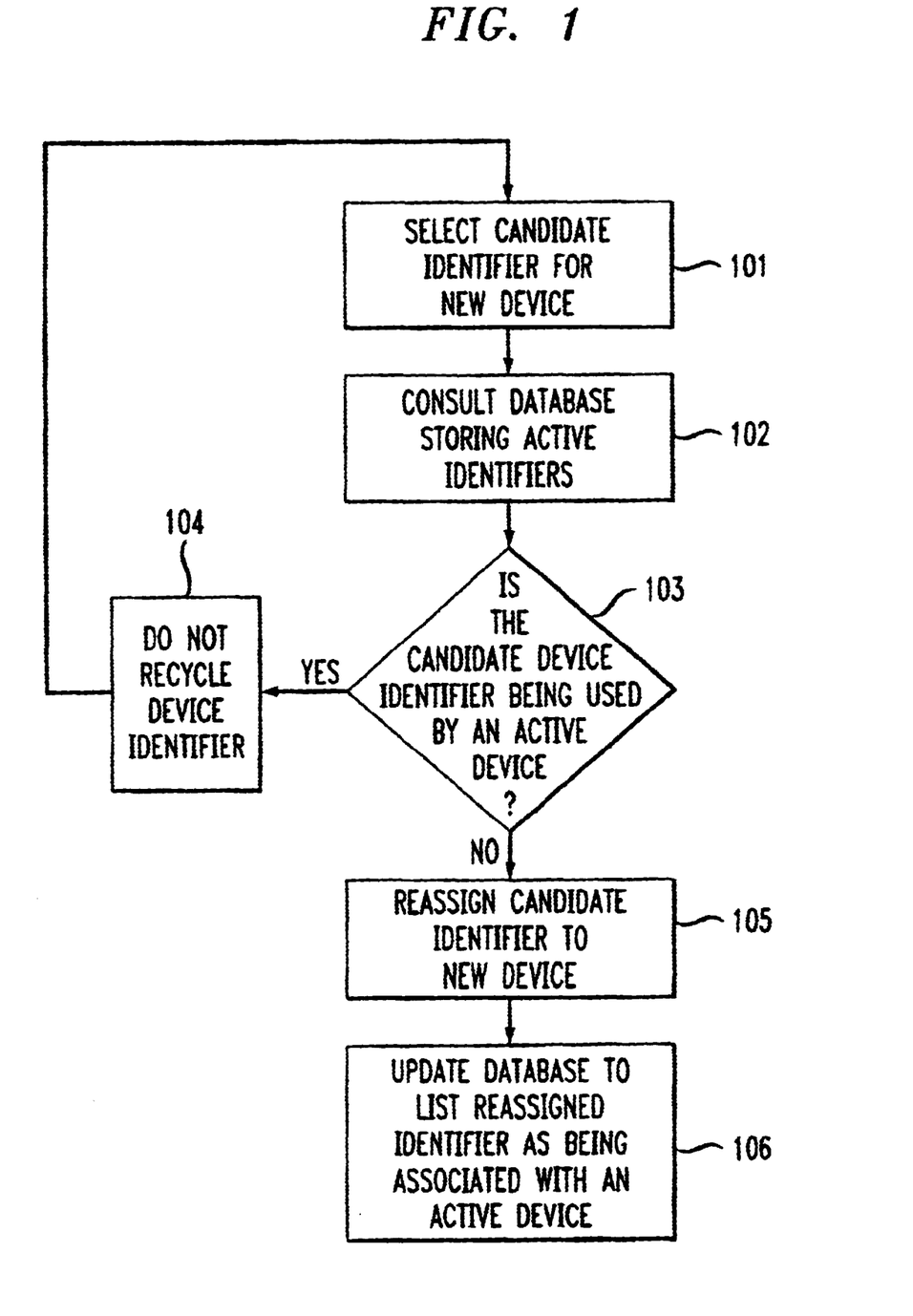
FIG. 1 is a flowchart showing address recycling in accordance with an embodiment of the method of the present invention.

In the future, it is possible that all Ethernet addresses will have been assigned, and it is likely that by that time, many of the devices that were assigned Ethernet addresses will have since stopped being used (e.g., because they are obsolete, broken and/or discarded.) Device addresses can advantageously be recycled in accordance with an embodiment of the present invention. The device address recycling method is based partly upon encoding the contents YEAR SUBFIELD, "Y":

$$Y=((Year-1) \text{ modulo } n)+1,$$

where n is an integer representing the longest lifetime expected of most devices assigned a unique address (e.g., an Ethernet address) in accordance with an embodiment of the present invention. The value Y recycles with a period of n years. In other words, if n=50, then Y=0 for the years 2000 and 2050, Y=1 for the years 2001 and 2051, and Y=49 for the year 2049. Thus, a unique identifier that includes Y can recur at the earliest every n years. FIG. 1 is a flowchart showing a method in accordance with an embodiment of the present invention for recycling device identifiers (e.g., globally unique identifiers). First, a candidate device identifier that includes Y is selected to be issued to a new device, step 101. A database that lists every device that is active along with its identifier is consulted to determine if the identifier is presently assigned to a device that is active, step 102. If there is an active device still using the identifier, step 103, then the identifier is not recycled, step 104, and a new candidate device identifier is selected, step 101. If there is no active device still using the identifier, step 103, then the previously issued identifier is recycled by issuing it to the new device, step 105. The database is then updated to reflect that the reassigned identifier is now associated with an active device, step 106. In the foregoing example, every fifty years, a unique device identifier that was formerly issued fifty years previously can become available. The method shown in FIG. 1 ensures that such an address is only recycled by issuing it to another device if and only if it is no longer being actively used by the device to which it was originally assigned. This recycling method advantageously allows device identifiers to be issued for as many years into the future as necessary.

In one embodiment of the present invention, a block of device identifiers is reserved for local use within at least one local network. The administrators of large corporate networks might use this set of local device identifiers to provide IP addresses to computers that are intended not to be visible to the WAN. For example, all those device identifiers that have a particular value in their most significant 16 bits might be reserved for local use, thereby leaving 32 bits with which to distinguish one local computer from another.

The SOCKET FIELD includes information about the source and/or destination of communications within a device, and serves to globally identify each communications endpoint. As used herein, the term "endpoint" means any original source or final destination of packetized data. More precisely, an "original source" is any source of a packet from the transport protocol layer or higher. A "final destination" is any destination of a packet that is in the transport protocol layer or higher. An example of such an endpoint is an application in a host computer. The "location" of the application is logically denoted by a socket number. Socket numbers are assigned within a computer so that no two applications concurrently use the same socket number. A socket number is reused only after it has been unused for a substantial length of time. In accordance with an embodiment of the present invention, the combination of the device identifier and the socket number is called the "endpoint identity." In one embodiment of the present invention, the socket number can be optional (e.g., unassigned value zero) in order to advantageously assure backward compatibility of the embodiment of the present invention with IPv4.

In accordance with an embodiment of the present invention, the location of devices accessible to a WAN are tracked, and the present location address of each is recorded. When an application program requests the IP address of a device from the Internet domain name service in accordance with an embodiment of the present invention, the domain name service is required to deliver both the device identifier and the present device location. The precision of its location can advantageously be required to meet different requirements, as appropriate, in different embodiments of the present invention. As delivered, the location address is always a legitimate network location address, but, particularly for mobile devices and devices that have recently been moved, the location address may be out of date by some amount of time. Thereafter, the application, wishing to stay in contact with the device, will need to know the new location addresses for the device as it moves from one place to another. Embodiments of the present invention keep the application informed about the present location address for the device.

In order for device location tracking to scale in a large network, an embodiment of the present invention advantageously uses the Internet domain name service and provides several methods for devices to advertise their current location. A device writes its present location address in packet source addresses; a device location service obtains the location for any device; a network supervision system tracks devices that come and go to the WAN; a tracking service advantageously provides tracking for fast-moving mobile devices; and address correction protocol handles misdirected packets efficiently; and an audit process is provided that automatically corrects device-location database errors.

The known domain name service provided for the Internet translates a domain name into an IPv4 address. In one embodiment, a domain name service translates a domain name into an address that includes a device identifier and a demark location. In another embodiment, the domain name service in accordance with the present invention provides the location of a device in response to a query for such a location. In one embodiment, a domain name server stores in a cache a table correlating a device identifier with a location. In response to a query for a device location, where the query includes a device identifier, the domain name server returns the location for that device by looking up the location correlated to that identifier and sending a packet with the location information to the source of the query.

For mobile devices, obtaining the location of the device can be more complex. A mobile cellular telephone device regularly exchanges "handshake" information with a base station, and adjacent base stations become aware of the device even before they are required to handle the device's traffic. In accordance with an embodiment of the present invention, a mobile device exchanges "handshake" information with an "inline agent", an application that ensures that a demark (e.g., a NIU) is aware of the mobile device's present location. For example, the mobile device sends "new location" information whenever its location changes in accordance with prescribed tolerances, e.g., new location information is sent from the mobile device whenever the device changes cells, city, more than 10 miles from its last reported location to the inline agent, etc.

For mobile devices, obtaining the location of the device can be more complex. A mobile cellular telephone device regularly exchanges "handshake" information with a base station, and adjacent base stations become aware of the device even before they are required to handle the device's traffic. In accordance with an embodiment of the present invention, a mobile device exchanges "handshake" information with an "inline agent" that ensures that a demark (e.g., a NIU) is aware of the mobile device's present location. For example, the mobile device sends "new location" information whenever its location changes in accordance with prescribed tolerances, e.g., new location information is sent from the mobile device whenever the device changes cells, city, more than 10 miles from its last reported location to the inline agent, etc.

An "inline agent" is hardware and software that operate to provide at least one specialized network service. In particular, the inline agent takes advantage of the separation of the device identifier and device location information in accordance with an embodiment of the present invention. Examples of inline agents given below include a tracking service inline agent; an audit and network supervision inline agent; and a packet forwarding inline agent. In accordance with an embodiment of the present invention, a packet that is to be sent to a destination device is provided with a location address designating an inline agent for further processing before being delivered to the destination device. For example, a packet that is to be sent to a mobile device is sent instead to a tracking service inline agent, which finds the location of the mobile device and then reformats the packet with the device's location address.

In accordance with another embodiment of the present invention, a packet that is to be sent to a destination device is sent to an authentication inline agent that authenticates the packet and attaches authentication information to the packet before forwarding the packet to the destination device. In yet another embodiment, a packet to be sent to a destination device is sent to a privacy inline agent which anonymizes the source of the packet and then forwards it to the destination device. "Anonymizing" a packet as used herein includes substituting an alias for source information that could be used to trace the sender of the packet. The address information of the sender is correlated with the alias by the privacy inline agent, and is stored in a trusted fashion. In order to reply to the packet, the destination device addresses a reply packet to the alias with location address and/or device identifier information provided by the privacy inline agent, which translates the alias into the original sender's address in a trusted and private fashion, and then forwards the reply packet to the original sender. This can be advantageous for e-commerce transactions where the buyer does not want its buying habits tracked by a vendor, because the buyer's alias can change from transaction to transaction. These are only examples of an inline agent in accordance with the present invention. The present invention is meant to encompass other inline agents, wherein a packet is sent to the inline agent instead of directly to a destination device, the packet is manipulated by the inline agent, and the manipulated ("processed") packet is then forwarded to the destination device, or, in another embodiment, to yet another inline agent for still further processing. For example, a packet that is sent to a privacy inline agent can be anonymized and then sent to a tracking inline agent for formatting and forwarding to the demark location address of a mobile device. An inline agent can be superior to other known methods of providing network services, such as tunneling. Unlike tunneling, the inline agent provides network services (e.g., packet forwarding) without requiring the original sender of the packet to know anything about any intermediary that may be required to communicate with a destination device, or even if an intermediary is required at all. The inline agent in accordance with an embodiment of the present invention is also superior to tunneling because the inline agent does not incur the overhead of successive encapsulation of a packet, as is incurred by tunneling.

Figure 2:
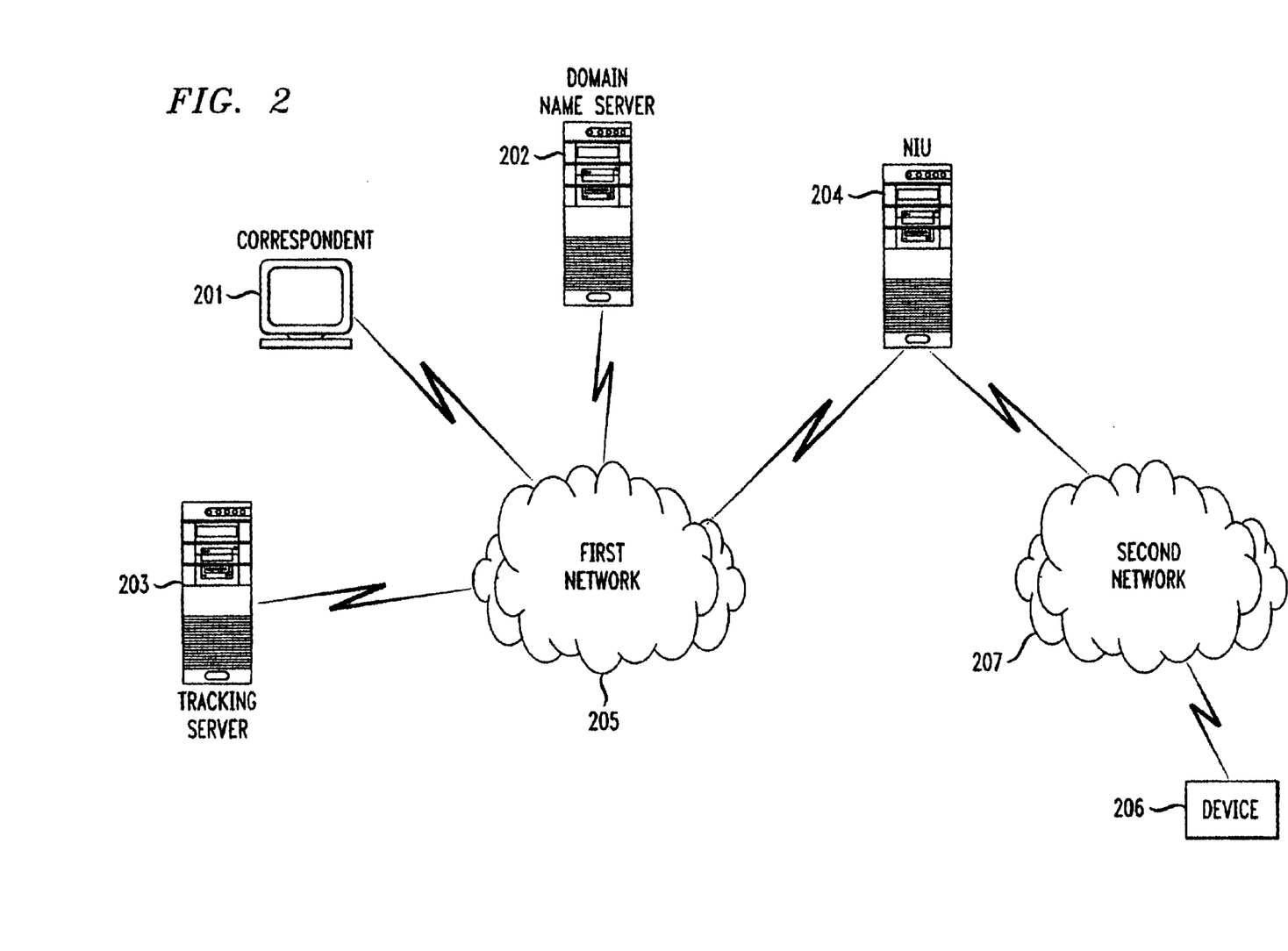
FIG. 2 shows a system wherein a correspondent sends a packet through a first network to Network Interface Unit, which forwards the packet to a device through a second network in accordance with an embodiment of the present invention.

In accordance with an embodiment of the present invention shown in FIG. 2, a correspondent 201, a domain name server 202, a tracking server 203, and a NIU 204 are coupled through a first network 205. NIU 204 is coupled to mobile device 206 through second network 207. Correspondent 201 wishes to send a packet to mobile device 203, and so correspondent 201 first sends a request (e.g., including the globally unique identifier of the mobile device, a name for the mobile device, etc.) to domain name server 202 requesting a location address (typically demark location address) for the mobile device 206. For any mobile device, the domain name server 202 typically stores a record that correlates the mobile device identifier (globally unique identifier, name, etc.) with the location address of an inline agent that keeps track of the location of the mobile device 206. In FIG. 2, the tracking service inline agent is located at the tracking server 203. The domain name server thus returns the location address for the tracking inline agent at the tracking server 203. The tracking server 203 tracks the location of a mobile device 206, e.g., by exchanging "handshake" information with the mobile device 206 whenever the mobile device 206 becomes active and/or becomes inactive, by "pinging" the mobile device 206, etc. The tracking server 203 maintains a record for a mobile device 206 that correlates the device's 206 globally unique identifier with its location (e.g., the location of a demark (such as NIU 204) through which packets to the mobile device can flow.)

For mobile devices (e.g., cellular telephones), a handshake or relatively frequent pinging may be required to maintain accurate location (e.g., demark location) information. For devices that are less mobile, such as an appliance that is moved only infrequently, location information can be determined to be current based upon more conservative methods known in the art, such as using a Time-To-Live (TTL) parameter, which indicates the period of time after which the location information was received by the tracking server 203 that the location information is valid. In other words, if the location information is older than the TTL parameter, it is no longer considered to be valid.

In accordance with an embodiment of the present invention, the domain name server 202 sends the location of the tracking server 203 to the correspondent 201 in response to the correspondent's 201 request for the location of the device 206. The correspondent 201 then sends a packet for the device 206 to the tracking server 203, which looks up the device's 206 location information, and forwards the packet to the appropriate location, e.g., to a demark (NIU 204) through which the device 206 may be reached, or to the device 206 directly. When the packet for the device 206 arrives at NIU 204, the NIU sends the packet through the second network 207 to the device 206.

Translation from device identifier to device location can be performed in a hash table and a memory size that is about three times larger than the size of the hash table. The expected access time would be about one memory cycle per transaction. There are presently about 50 million hosts registered with the domain name service. Assuming about 50 bytes per device identifier, the entire domain name database in an embodiment of the present invention would fit within a 10 gigabyte memory. The expected access time would be the cycle time of a Dynamic Access Random Access Memory module. As the Internet grows, so will the sizes of computer memory devices. These two phenomena will allow practical and fast database servers to be constructed even as the number of network users grows. Such fast database servers will aid in the implementation of certain embodiments of the present invention. In practice, the domain name database in accordance with the present invention is best implemented in parts, with few (if any) servers needed to store the domain name database in its entirety.

A network supervision and audit system in accordance with an embodiment of the present invention tracks equipment changes, reconfiguration and/or failure substantially as it occurs. In one embodiment, this is achieved by monitoring the network in a distributed fashion, e.g., having a monitoring function carried out locally in various subparts of a WAN. In one embodiment, this monitoring function is performed by polling various network assets periodically, e.g., once per second, and reporting any significant change to the appropriate network management systems. Certain changes may be managed locally, without any reporting needed. The network supervision and audit system in accordance with an embodiment of the present invention can advantageously maintain a substantially accurate record of the network's configuration, including the demark locations of non-mobile devices that are coupled to the network.

Another feature of the network supervision and audit system includes the systematic exploration of the condition and state of the network, in one embodiment. Various parts of the network are scanned to obtain configuration and state information, which is compared with the configuration and state information that is stored in the network databases. Database records that are inaccurate are advantageously updated, e.g., domain name system databases are updated. This prevents the accumulation of erroneous records in network databases. In one embodiment, this scanning process occurs in the background, at low cost, e.g., it is performed more during periods of lower demand for network bandwidth.

A privacy protocol in accordance with an embodiment of the present invention includes stripping source location information from a packet at a demark en route from the sender to the recipient. The location information is cached at the demark, so that when a reply is received at the demark, the address information can be associated with the reply. Because the present invention separates device identifier information from device location information, the information stripped at the demark can be the identifier information only, location information only, or the demark can advantageously strip the address information and insert an alias, meanwhile caching a record that correlates the alias with the stripped address information. When a reply is received at the demark addressed to the alias, the demark re-addresses the packet to the address correlated with the alias.

Figure 3:
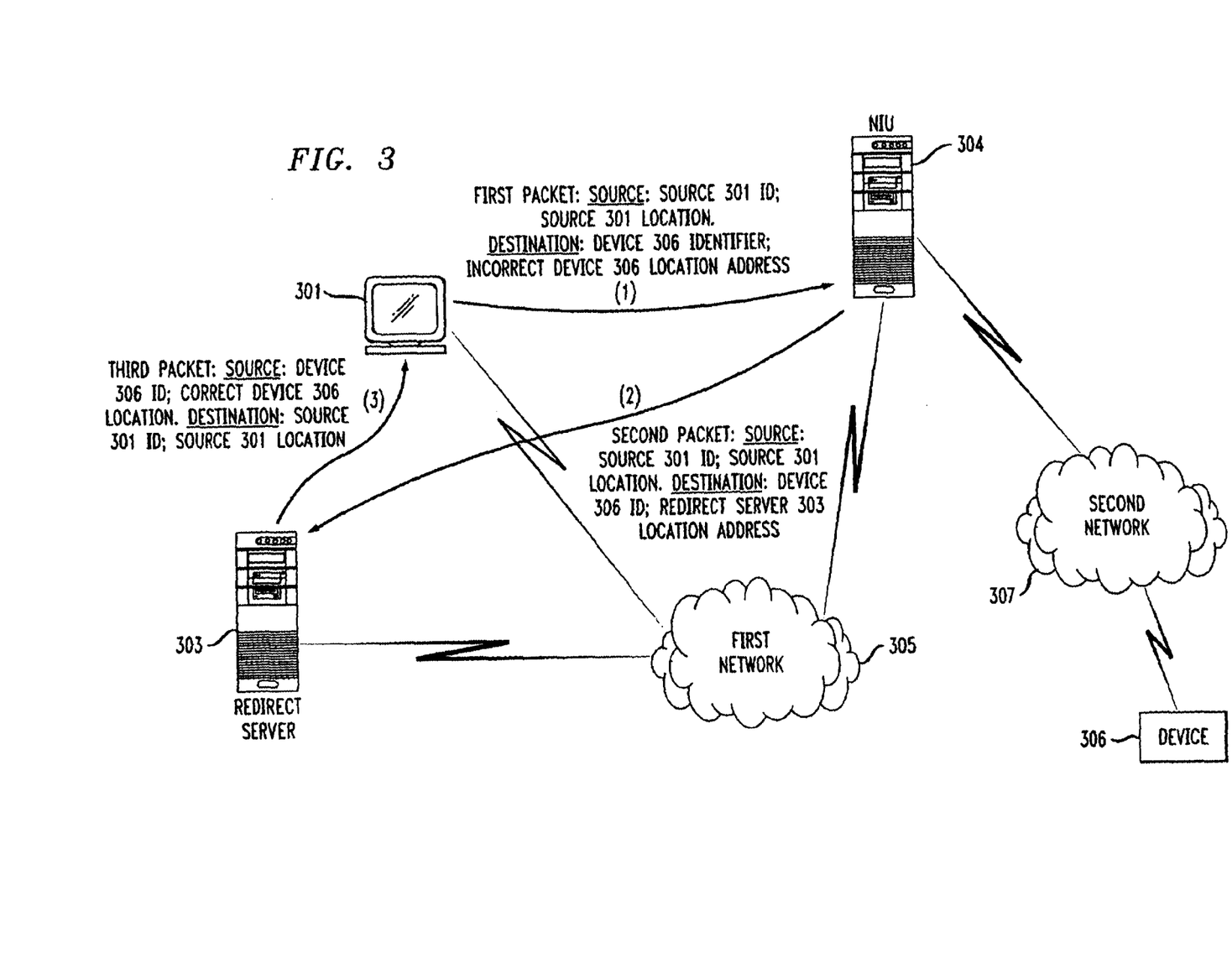
FIG. 3 shows a packet redirect system in accordance with an embodiment of the present invention.

An address correction system is provided in accordance with an embodiment of the present invention, an example of which is shown in FIG. 3. FIG. 3 shows a system that includes a source 301, a redirect server 303 and an NIU 304 that are coupled to a first network 305. The NIU 303 and a destination device 306 are coupled to a second network 307. FIG. 3 also shows three communications between components of this system. Each communication is designated by an arrow. The first communication is labeled (1), the second communication is labeled (2), and the third communication is labeled (3). Although the arrows are shown running directly from one component to another, the communications travel through the system as shown in FIG. 3. For example, communication (1) travels from source 301 to NIU 304 through first network 305, even though communication arrow (1) does not run through the first network 305. Thus, the arrows are meant to show what information flows between the endpoints between which the arrows run, and not how the information flows. The underlying system shown in FIG. shows how the information flows, as will be readily apparent to one of ordinary skill in the art.

As shown in FIG. 3, if a first packet arrives from a source 301 at a demark (e.g., an NIU 304) with a device identifier that is unknown at the NIU 304, the NIU 304 will be unable to forward the packet to the destination device 306. In response, the packet is discarded at the demark 304, and the NIU 304 formulates a second packet whose source address is the source 301 identifier and the source 301 location address, and whose destination address is the destination device 306 identifier and the location address of the redirect message server 303.

The NIU 304 then sends the second packet into the first network 305, which delivers it to redirect message server 303. At the redirect message server 303, the correct location address for the destination device 306 is determined. The redirect message server 303 formulates a third packet, whose source address includes the destination device 306 identifier, and the now correct location address of the destination device 306. The destination address of the third packet is the source 301 identifier and the source 301 location address. The redirect message server 303 then sends the third packet into the network, which delivers the third packet to the source 301. The source takes note of the destination device identifier and destination device location address in the third packet, and updates its own tables to ensure that this correct location address is properly correlated with the destination device 306 identifier. Future packets sent from the source 301 to the destination device 306 (through network 305 to NIU 304 through network 307) advantageously include the correct location address for the destination device 306.

Figure 4:
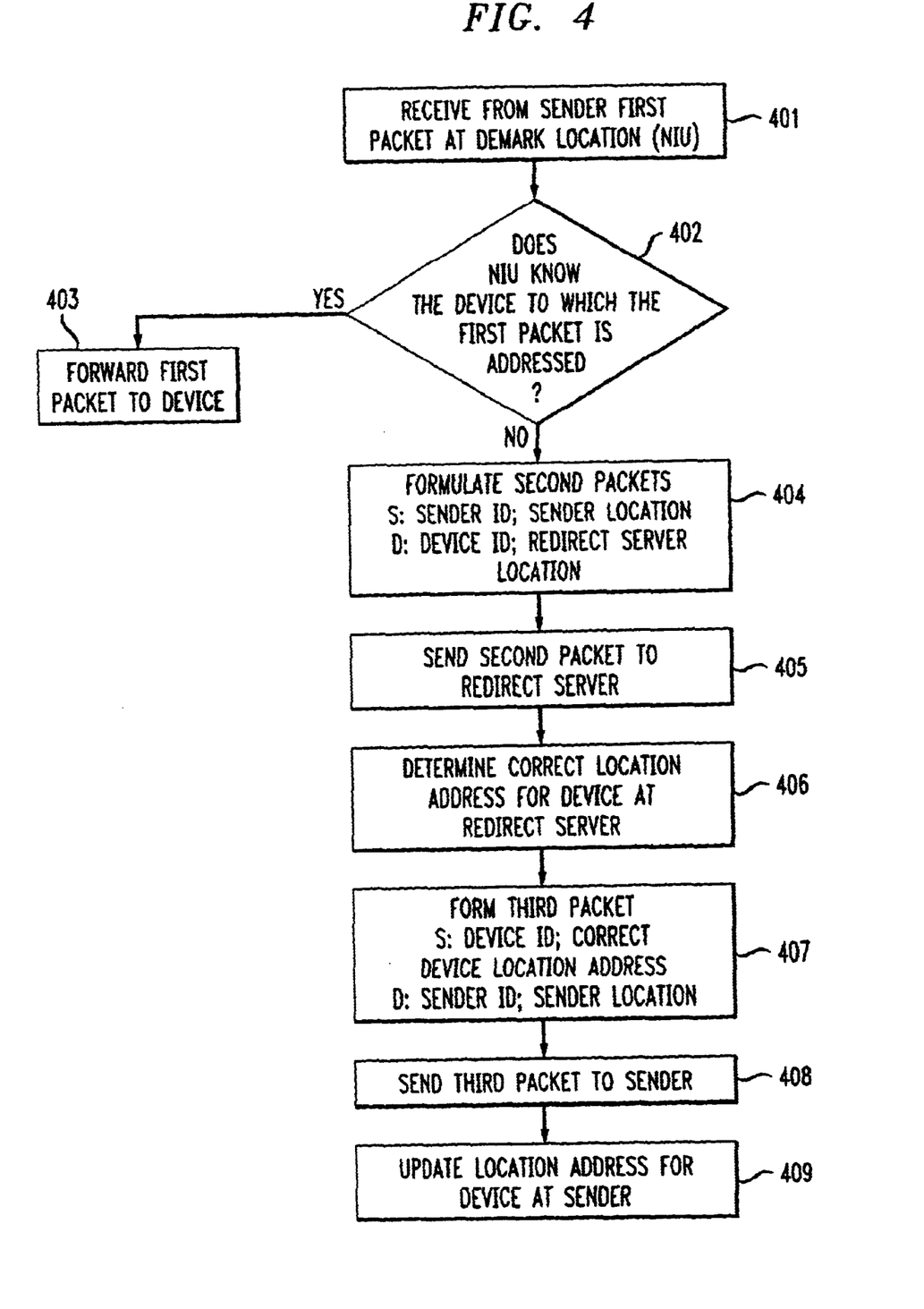
FIG. 4 is a flowchart showing a packet redirect in accordance with an embodiment of the method of the present invention.

A flowchart of the redirect service in accordance with the present invention is shown in FIG. 4. A first packet is received from a sender at a demark by a NIU, step 401. The source address of the first packet is the sender's identifier and the sender's location address; the destination address of the first packet is a destination device's identifier and the destination device's location address. The NIU at the demark determines if destination device identifier is known to the NIU, step 402. If it is known, then the first packet is forwarded by the NIU at the demark to the device, step 403. If it is not known, then the NIU formulates a second packet whose source address includes the sender's globally unique identifier and the sender's location address; the destination address includes the device identifier and the location address of a redirect server, step 404. The NIU then sends the second packet to network, which delivers the second packet to the redirect message server, step 405. The redirect message server determines the correct location address that corresponds to the device identifier in the destination address of the second packet, step 406. The redirect message server formulates a third packet whose source address includes the device identifier and the correct device location address; the destination address includes the sender's globally unique identifier and the sender's location address, step 407. The redirect message server sends the third packet to the network, which delivers the third packet to the sender, step 408. The sender notes the device identifier and device location address in the source of the received third packet, and updates its records so that the device identifier corresponds to the correct device location address, step 409. Note that the device location address can be the location address of a demark (e.g., a NIU) through which a packet passes on its way to the device. Packets sent subsequently from the sender to the device include in their destination address the device identifier and the correct device location address.

The above embodiment is merely exemplary of a redirect service in accordance with the present invention. Other redirect services that benefit from the separation of the identifier from the location address in accordance with the present invention are also encompassed. For example, in one embodiment, the errant first packet is returned to the sender, rather than to a redirect server; the sender then contacts a tracking service, obtains the correct location address for the destination device, reformats the packet with the device identifier and the correct device location address, and resends it. In another embodiment, the NIU corrects the packet by obtaining the correct device location address from a tracking service, forwards the corrected packet, and sends a redirect message to the sender that includes the device identifier and the corrected device location address. In yet another embodiment, the errant packet is sent to a redirect server, which corrects the device location address in the packet and then sends it on to the destination device. The redirect server sends a redirect message to the sender that the sender uses to correct the location address it stores for the device. Each of the foregoing embodiments of a redirect service takes advantage of the separation of the device identifier and device location address in accordance with the present invention. The present invention encompasses any redirect service that operates in accordance with the separation of device identifier and location addresses.

An "inline agent" is hardware and software that operate to provide specialized network services in certain embodiments of the present invention. Examples of inline agents include the redirect message service provided by the redirect message server, the tracking service that inserts mobile address locations into packet headers, etc. In accordance with an embodiment of the present invention, inline agents must be trusted because they manipulate packet headers. An inline agent can be reached by the appropriate use of the location address field, i.e., by inserting at the source the location of the inline agent rather than the location of the destination device in the header of a packet. This advantageously permits the use of the inline service without interfering with the source and destination device identifiers, another benefit of separating the device identifier and location fields in accordance with an embodiment of the present invention. The location of an inline device can advantageously be conveniently specified by including a well-known (across the network) identifier for an inline agent in the location field rather than, say, an actual demark location. A regional node in the network can advantageously translate an inline service identifier to the address of a host that provides the inline service for that region of the network.

In one embodiment of the present invention, an inline agent serves LANs that are coupled to the WAN through more than one demark. The criteria to be used in routing traffic that potentially has multiple delivery points transcends the knowledge that is readily available to the network routers and switches. For example, such routing criteria can include information about network failures and congestion; customer-defined policies related to using different service providers, pricing plans and quality of service; and load balancing among LAN entry points. As with packets sent to a mobile device, packets directed to a LAN with more than one demark should be routed using an inline agent that installs the appropriate demark location in the packet's destination address based upon routing criteria. Thus, packets sent to the inline agent find the best demark through which the packet should enter the LAN, inserts the location for that demark in the packet destination address, and sends the packet to the demark. An inline agent in accordance with an embodiment of the present invention is a trusted process that is close to the packet forwarding process, but is isolated from it so that the architecture and the integrity of the forwarding engine is not compromised by the existence of the agent.

In accordance with an embodiment of the present invention, a host, NIU, source, sender, correspondent, server and device typically include a processor, a memory and a port adapted to be coupled to a network. The memory and the port are coupled to the processor. A processor can be a general purpose microprocessor, such as the Pentium III processor manufactured by the Intel Corporation of Santa Clara, California. A processor can also be an Application Specific Integrated Circuit (ASIC), which is a special-purpose processor that embodies at least a part of the method in accordance with the present invention in its hardware and/or firmware. An example of an ASIC is a digital signal processor. Memory is any device that is adapted to store digital information, such as Random Access Memory (RAM), Read Only Memory (ROM), a hard disk, flash memory, optical memory (e.g., a Compact Disk, Read Only Memory (CD-ROM)), etc. At least a portion of the memory should typically be writeable as well as readable. The memory stores instructions adapted to be executed by the processor to perform the steps in accordance with an embodiment of the present invention. For example, a tracking server includes memory storing tracking server instructions adapted to be executed by a processor at the tracking server to identify the correct location address information for a given device identified by its globally unique device identifier. A redirect server includes redirect instructions that are stored in memory at the redirect server. The redirect instructions are adapted to be executed by a processor at the redirect server to obtain a correct device location address (e.g., by communicating with a tracking server) and to formulate a packet whose source address is identifier of a destination device and the correct location address for that destination device, and whose destination address is the identifier and location address of a sender of a packet to the destination device. The redirect instructions are further adapted to send the formulated packet through a port at the redirect server to a network to which the redirect server is coupled through the port.

Instructions that are adapted to be executed by a processor to perform the method in accordance with an embodiment of the present invention can be stored on a medium. A medium is "memory" as defined above, i.e., any device adapted to store digital information. A medium must be readable, but need not be writeable.

The phrase "instructions that are adapted to be executed by a processor" are meant to encompass instructions that can be executed by a processor either directly or indirectly. For example, this phrase encompasses (compiled) machine code that can be executed directly by a processor, and also source code that must be compiled or interpreted, code that is encrypyted or otherwise secured and must be preprocessed in order to be executable by a processor, etc.

A data signal can be the product of a system operating in accordance with the method of an embodiment of the present invention. A data signal is an electromagnetic signal constructed in accordance with an embodiment of the present invention. An example of a data signal is a packet constructed in accordance with an embodiment of the present invention, e.g., a packet that is constructed and sent with separate fields for a globally unique device identifier and a location address for the device that corresponds to the identifier. Another example of a data signal is a packet that is formulated and sent with a DEMARK CODE SUBFIELD and a NETWORK CODE SUBFIELD.

The present invention provides a network addressing scheme that advantageously scales well, is efficient, flexible and fast. The embodiments described above are merely examples illustrating various aspects of the present invention, which is not limited by these examples. For example, the present invention encompasses any inline agent that exploit the separation of device identifier and device location address information in accordance with the present invention, and is not limited to the exemplary inline agents described above. For example, the present invention encompasses inline agents for providing other network services, including network access control, network usage metering, database coherency services, etc.

What is claimed is:

1. A method for providing a network service including:

receiving a packet that includes device identification information that is distinct from location address information;

processing the packet, and wherein processing the packet includes anonymizing the device identification information included in the received packet; and forwarding the packet to a location address.

2. The method of claim 1, wherein the packet includes a globally unique device identifier and location address information that is distinct from the globally unique device identifier.

3. The method of claim 1, wherein processing the packet includes:

determining the location address for the identified device; and inserting the location address for the identified device into the packet.

4. The method of claim 3 wherein processing the packet includes anonymizing the location address included in the received packet.

5. The method of claim 1, wherein forwarding the packet to a location address includes forwarding the packet to the location address of a demark.

6. The method of claim 5, wherein the demark is a network interface unit.

7. The method of claim 1, wherein forwarding the packet to a location address includes forwarding the packet to the location address of the device corresponding to the device identifier.

8. The method of claim 1, wherein processing the packet includes anonymizing the device identification information and anonymizing the location address information.

9. The method of claim 1, wherein the device identification information is selected from a group comprising year subfield, date field, serial number subfield, manufacturer subfield, manufacturer code, demark code subfield or network code subfield.

10. A program storage device readable by a machine, tangibly embodying a program of executable instructions to perform a method for providing a network service, the method comprising:

(a) receiving a packet that includes device identification information that is distinct from location address information;

(b) processing the packet, and wherein processing the packet includes anonymizing the device identification information included in the received packet; and (c) forwarding the packet to a location address.

11. The program storage device of claim 10, wherein the packet includes a globally unique device identifier and location address information that is distinct from the globally unique device identifier.

12. The program storage device of claim 10, wherein processing the packet includes:

determining the location address for the identified device; and inserting the location address for the identified device into the packet.

13. The program storage device of claim 10, wherein processing the packet includes anonymizing the location address included in the received packet.

14. The program storage device of claim 10, wherein forwarding the packet to a location address includes forwarding the packet to the location address of a demark.

15. The program storage device of claim 14, wherein the demark is a network interface unit.

16. The program storage device of claim 10, wherein forwarding the packet to a location address includes forwarding the packet to the location address of the device corresponding to the device identifier.

17. The program storage device of claim 10, wherein processing the packet includes anonymizing the device identification information and anonymizing the location address information.

18. The program storage device of claim 10, wherein the device identification information is selected from a group comprising year subfield, date field, serial number subfield, manufacturer subfield, manufacturer code, demark code subfield or network code subfield.

* * * * *